(12) United States Patent
Mitani (10) Patent No.: US 12,551,361 B2
(45) Date of Patent: Feb. 17, 2026

(54) JAW POSITION CORRECTING APPARATUS AND METHOD FOR MANUFACTURING JAW POSITION CORRECTING APPARATUS

(71) Applicant: Kabushiki Kaisha RAMPA master product, Musashino (JP)

(72) Inventor: Yasushi Mitani, Tokyo (JP)

(73) Assignee: Kabushiki Kaisha RAMPA master product, Tokyo (JP)

( * ) Notice: Subject to any disclaimer, the term of this patent is extended or adjusted under 35 U.S.C. 154(b) by 0 days.

(21) Appl. No.: 19/111,360

(22) PCT Filed: Jun. 29, 2023

(86) PCT No.: PCT/JP2023/024187
§ 371 (c)(1),
(2) Date: Mar. 13, 2025

(87) PCT Pub. No.: WO2024/057668
PCT Pub. Date: Mar. 21, 2024

(65) Prior Publication Data
US 2025/0262078 A1    Aug. 21, 2025

(30) Foreign Application Priority Data

Sep. 16, 2022  (JP) ................................ 2022-147758

(51) Int. Cl.
| | | |
|---|---|---|
| *A61F 5/01* | (2006.01) | |
| *A61C 7/06* | (2006.01) | |
| *A61C 7/08* | (2006.01) | |

(52) U.S. Cl.
CPC .................. *A61F 5/01* (2013.01); *A61C 7/06* (2013.01); *A61C 7/08* (2013.01)

(58) Field of Classification Search
CPC .... A61C 7/06; A61C 7/08; A61C 7/10; A61C 7/065
See application file for complete search history.

(56) References Cited

U.S. PATENT DOCUMENTS 2,151,458 A * 3/1939 Allen .................. A61F 5/05891
602/17
2,325,300 A * 7/1943 Bisnoff ............... A61F 5/05891
602/17
(Continued)

FOREIGN PATENT DOCUMENTS

| JP | S54-125199 U1 | 9/1979 |
|---|---|---|
| JP | 4058105 B1 | 3/2008 |

(Continued)

OTHER PUBLICATIONS

Translation of jp2021090649 (Year: 2021).*
(Continued)

*Primary Examiner* — Thomas C Barrett
*Assistant Examiner* — Matthew P Saunders
(74) *Attorney, Agent, or Firm* — Myers Wolin, LLC (57) ABSTRACT

A jaw position correcting apparatus includes an orthotic device, a tractor, and orthotic helmet, wherein the tractor includes a pulled part and a helmet fixing part and the orthotic helmet includes a first covering part that covers a frontal region and left and right temporal regions of the head, a second covering part that covers an occipital region of the head, a pair of extending parts that extend downward from portions of the first covering part, a pair of third covering parts that extend forward from the extending parts along zygomatic arches, and a first fixing part provided on the first covering part and fixing the helmet fixing part and the pulled part includes a first locking part urged forward by a first elastic member, a second locking part urged upward by a second elastic member, and a third locking part urged upward by a third elastic member.

12 Claims, 9 Drawing Sheets

(56) References Cited

U.S. PATENT DOCUMENTS

| | | | | |
|---|---|---|---|---|
| 3,391,693 | A | * | 7/1968 | Georgiade ......... A61B 17/6433 |
| | | | | 602/17 |
| 3,423,832 | A | * | 1/1969 | Nelson ..................... A61C 7/06 |
| | | | | 433/5 |
| 4,988,291 | A | * | 1/1991 | Grummons .............. A61C 7/06 |
| | | | | 433/5 |
| 5,158,451 | A | * | 10/1992 | Pourcho ................... A61C 7/06 |
| | | | | 433/5 |
| D357,555 | S | * | 4/1995 | Brueckner ................... D29/106 |
| 6,428,494 | B1 | * | 8/2002 | Schwenn ............ A61F 5/05891 |
| | | | | 602/17 |
| 9,232,827 | B1 | * | 1/2016 | Penn ....................... A42B 3/324 |
| 12,274,596 | B1 | * | 4/2025 | Yousefian ................ A61C 7/06 |
| 2004/0199094 | A1 | * | 10/2004 | Greene .............. A61F 5/05891 |
| | | | | 602/17 |
| 2009/0098499 | A1 | * | 4/2009 | Mitani .................. A61C 7/065 |
| | | | | 433/5 |
| 2014/0170584 | A1 | * | 6/2014 | Mitani .................. A61C 7/065 |
| | | | | 433/5 |
| 2019/0015238 | A1 | * | 1/2019 | Mottram ............ A61F 5/05891 |
| 2021/0045844 | A1 | | 2/2021 | Park |

FOREIGN PATENT DOCUMENTS

| | | | | |
|---|---|---|---|---|
| JP | 2012-71001 | A | | 4/2012 |
| JP | 5466797 | B1 | | 4/2014 |
| JP | 2021-500179 | A | | 1/2021 |
| JP | 2021090649 | A | * | 6/2021 ............... A61C 7/10 |
| JP | 7233146 | B1 | | 3/2023 |
| KR | 20-2009-0011810 | U | | 11/2009 |

OTHER PUBLICATIONS

International search report with the Written Opinion of the International Searching Authority issued by the Japan Patent Office for International Patent Application No. PCT/JP2023/024187, mailed on Sep. 12, 2023, with an English translation of the International Search Report.

Notice of Reasons for Refusal issued by the Japan Patent Office for corresponding Japanese Patent Application No. 2022-147758, mailed on Nov. 18, 2022, with an English translation.

Decision to Grant a Patent issued by the Japan Patent Office for corresponding Japanese Patent Application No. 2022-147758, mailed on Feb. 7, 2023, with an English translation.

\* cited by examiner

JAW POSITION CORRECTING APPARATUS AND METHOD FOR MANUFACTURING JAW POSITION CORRECTING APPARATUS

CROSS-REFERENCE TO RELATED APPLICATION

This application is a National Stage under 35 U.S.C. 371 of International Patent Application No. PCT/JP2023/024187, filed on Jun. 29, 2023, which claims priority of Japan Patent Application No. 2022-147758 filed on Sep. 16, 2022, the entire contents of each are herein incorporated by reference.

TECHNICAL FIELD

Background Art

In the field of orthodontics and a maxillofacial oral growth treatment, a correcting apparatus has been known which promotes proper growth of the jaw position and the dentition by pulling the orthotic device in the oral cavity forward from the outside of the oral cavity. For example, a jaw position correcting apparatus (maxillofacial correcting apparatus) has been known which mounts a headgear onto the head of a person attached with an orthotic device in his/her mouth and pulls the orthotic device forward and upward using a tractor interposed between the headgear and the orthotic device. The headgear has a configuration in which sponge pads and/or strip-shaped bands are secured to a wire frame assembled by welding metallic wires (see Patent Documents 1 to 3). Such a configuration achieves a headgear that is light in weight and is easily adapted to the shape of the head.

RELATED ART REFERENCE

Patent Document

[Patent Document 1] JP 4058105 B
[Patent Document 2] JP 5466797 B
[Patent Document 3] JP 2021-500179 A

SUMMARY

Technical Problem

On the other hand, the above headgear may be displaced relative to the head when being applied with external force, and there is a problem that the traction direction of the orthotic device is not easily stabilized in some usages of the orthotic device. For example, when the wearer lies down on a sofa or a bed while wearing the headgear, the position of the headgear may be displaced relative to the head. As a result, the traction direction of the orthotic device is changed, and the orthodontic effectiveness of the jaw position and the dentition lower. In particular, if the wearer of the headgear is a child, there is a possibility that the position of the headgear may be constantly displaced because the skirt or sleeve of the clothes may be caught by the wire frame during the wearer is playing, or the headgear may hit the wall of a room.

With the foregoing problem in view, one of the object of the present disclosure is to provide a jaw position correcting apparatus and a process for manufacturing the jaw position correcting apparatus that can suppress the displacement in the traction direction with a simple configuration. In addition to this object, actions and effects which are derived from each configuration of "Description of Embodiments" to be described below and which related technique does not attain are regarded as other objects of the present disclosure.

Solution to Problem

The disclosed jaw position correcting apparatus and a process for manufacturing the same can be achieved in the embodiment and the application to be disclosed below and solves at least some of the above problems.

The disclosed jaw position correcting apparatus includes: an orthotic device attached to an upper jaw inside a mouth; a tractor that pulls the orthotic device upward and forward; and an orthotic helmet worn by a head of a user of the orthotic device and fixing the tractor.

The tractor includes: a pulled part coupled to the orthotic device and extending to an outside of the mouth; and a helmet fixing part fixed to the orthotic helmet.

The orthotic helmet includes: a first covering part that covers a frontal region and left and right temporal regions of the head; a second covering part that extends rearward from the first covering part and covers an occipital region of the head; a pair of extending parts that extend downward from portions of the first covering part, the portions covering the left and right temporal regions; a pair of third covering parts that extend forward from the extending parts along zygomatic arches and cover a portion near zygomatic body; and a first fixing part provided on the first covering part and fixing the helmet fixing part.

The pulled part includes: a first locking part provided to a front end of a forward extending part extending from an inside of the mouth to an outside of the mouth and urged upward by a first elastic member, the first elastic member being interposed between the first locking part and the helmet fixing part; a second locking part provided on the front end of the forward extending part and urged forward by a second elastic member, the second elastic member being interposed between the second locking part and the helmet fixing part, and a third locking part provided on a rear end of a curved part extending from the front end of the forward extending part to a portion near an auricle and urged upward by a third elastic member; the third elastic member being interposed between the third locking part and the orthotic helmet.

The disclosed method for manufacturing a jaw position correcting apparatus manufactures the jaw position correcting apparatus having the above configuration. First of all, the disclosed method includes: obtaining three-dimensional (3D) shape information of the head with a 3D scanner; forming, based on the 3D shape information obtained by the 3D scanner, the orthotic helmet that comprises the first covering part, the second covering part, the pair of left and right third covering parts, the pair of left and right extending parts and that includes an internal shape corresponding to the 3D shape information with a 3D printer; and forming a tractor comprising a pulled part coupled to the orthotic device attached to an upper jaw inside the mouth and the helmet fixing part fixed to the orthotic helmet.

Then the method further includes: fixing the helmet fixing part to the first covering part of the orthotic helmet; interposing the first elastic member that urges upward the pulled part between the first locking part provided to the front end of the forward extending part of the pulled part and the helmet fixing part; interposing the second elastic member that urges forward the pulled part between the second locking part provided to the front end of the forward extending part of the pulled part and the helmet fixing part; and interposing the third elastic member that urges upward the pulled part between the third locking part provided to the rear end of the curved part of the pulled part and the orthotic helmet.

Advantageous Effects

The disclosed technique can enhance the stability in the worn state and can suppress displacement of the orthotic device by the tractor, so that appropriate growth of the jaw position and dentition can be promoted.

DESCRIPTION OF EMBODIMENTS

The disclosed orthotic helmet is worn on the head of a person with an orthotic device attached to the upper jaw in the mouth. To the orthotic helmet, a tractor for pulling the orthotic device forward and upward is secured. The tractor is an instrument that exerts a force that pulls an orthotic device forward and upward against the orthotic helmet, and is also called an active bow. As a specific example of a tractor, a part of the configuration described in Japanese Patent No. 5466797 can be applied. The "jaw position correcting apparatus" may be used as the name of the whole including an orthotic device, a tractor, and an orthotic helmet.

The disclosed orthotic helmet can be used in place of a headgear (a device that secures pads made of sponge or strip-shaped bands to a metallic wire frame and is mounted on a head) in a related RAMPA® device described in, for example, Japanese Patent No. 4058105 and Japanese Patent No. 5466797. The name RAMPA is derived from Right Angle Maxillary Protraction Appliance (which means an orthotic that pushes a maxilla at a correct proper angle). The jaw position correcting apparatus including the orthotic helmet disclosed herein may also be referred to as a RAMPA device.

The orthotic device is a device for applying a depressing force in the forward and upward direction while aligning the upper jaw dentition, and is also referred to as a ROA (RAMPA Oral Appliance). A specific example of the ROA includes an orthotic device including a depressing plate (Sup-Ad) and an adjuster mechanism described in Japanese Patent No. 6732272. The forward and upward depressing force can also be applied solely by the orthotic device. On the other hand, the combined use of the orthotic device, the orthotic helmet, and the tractor increases the forward and upward depressing force, so that the orthotic effect of the jaw position and dentition is improved.

The disclosed orthotic helmet and jaw position correcting apparatus may be suitably applied to children whose jawbones are in a growing period (e.g., children aged 6-12 years). However, the disclosed orthotic helmet and jaw position correcting apparatus are targeted for any age, and can be applied to adolescents and adults. In addition, the directions used in the description (i.e., the directions of the components and the portions constituting the jaw position correcting apparatus) are based on the directions seen from the wearer of the jaw position correcting apparatus, unless otherwise specified.

EXAMPLES

1. Configuration 1-1. Orthotic Helmet

Figure 1:
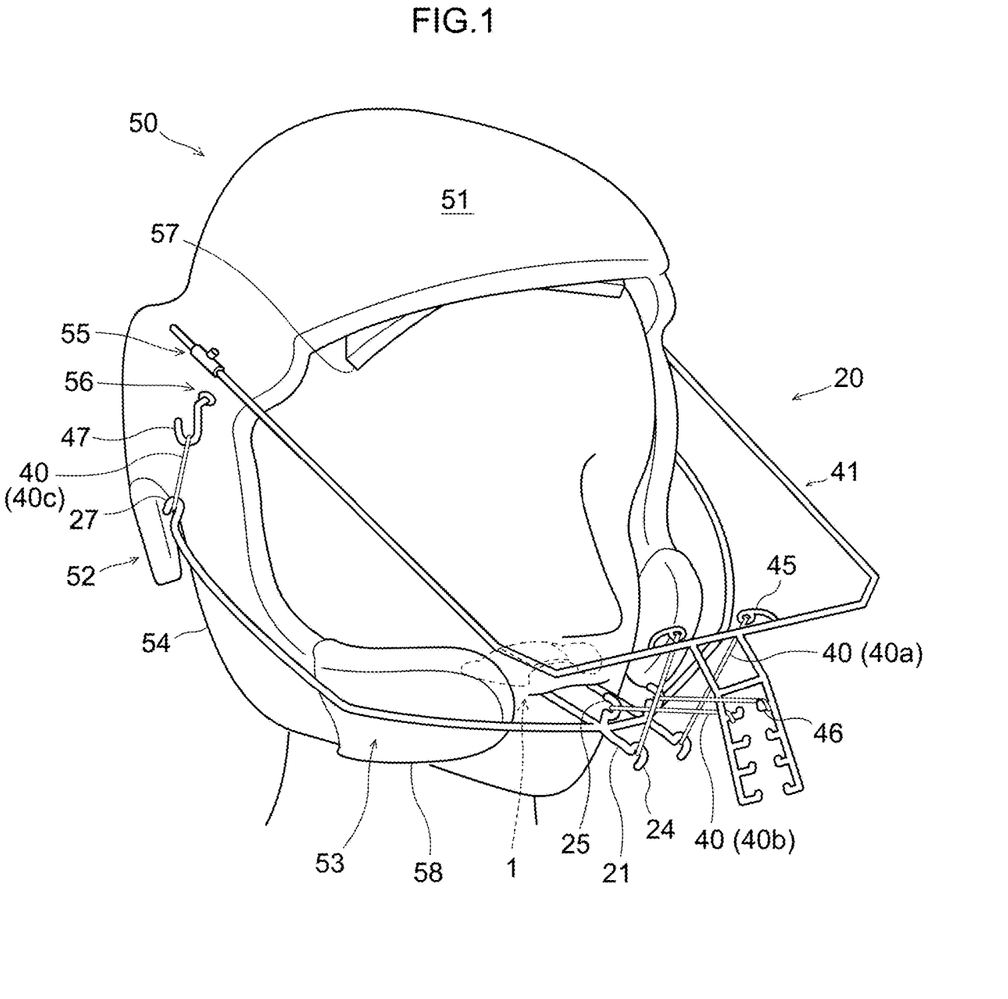
FIG. 1 is a perspective view showing an orthotic helmet according to an embodiment seen from obliquely front.
Figure 2A:
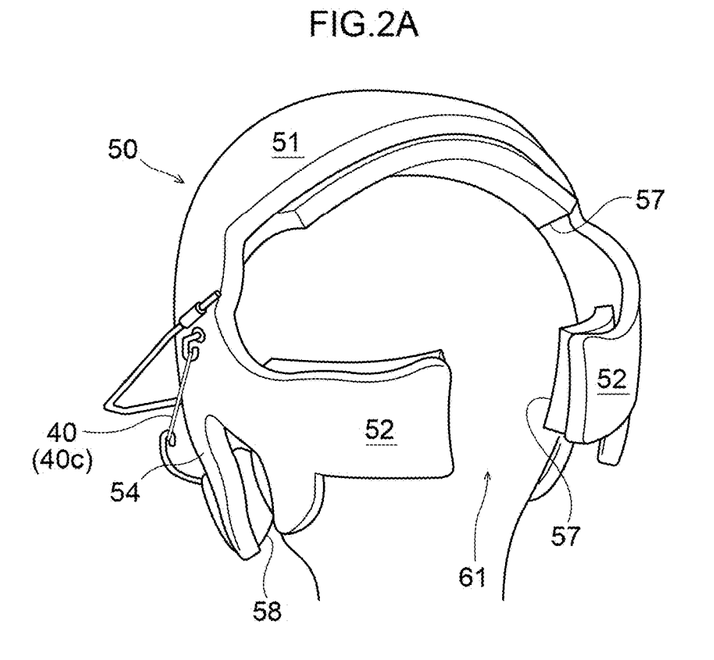
FIGS. 2A and 2B are perspective views showing the orthotic helmet seen from obliquely rear.
Figure 2B:
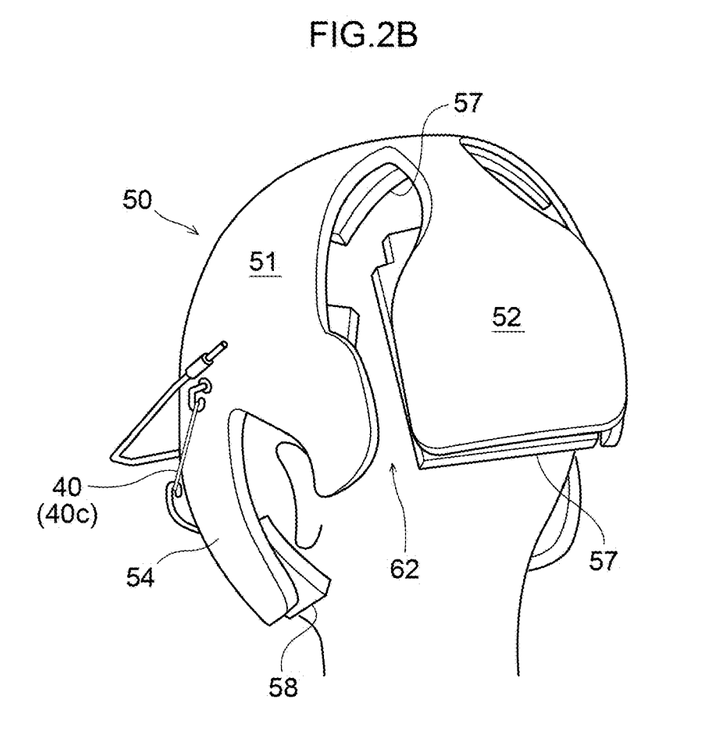

FIG. 1 is a perspective view showing a head of a person wearing a jaw position correcting apparatus including an orthotic helmet 50 according to an embodiment when viewed obliquely from the front, and FIGS. 2A and 2B are perspective views showing the person when viewed from the obliquely rear. The orthotic helmet 50 is mounted on the head of a person whose upper jaw in the mouth is attached with the orthotic device 1.

To the orthotic helmet 50, a tractor 20 that pulls the orthotic device 1 forward and upward is secured. The tractor 20 includes a pulled part 21 that is coupled to the orthotic device 1 and extending outside the mouth, a helmet fixing portion 41 fixed to the orthotic helmet 50, and multiple elastic members 40 (40a-40c) elastically engage the helmet fixing part 41 with the orthotic helmet 50 and applies urging force to pull the pulled part 21 forward and upward. A specific example of the elastic member 40 include a rubber band and a coiled spring.

As shown in FIG. 1, the orthotic helmet 50 includes a first covering part 51, a second covering part 52, third covering parts 53, extending parts 54, a first fixing part 55, second fixing parts 56, and inner pads 57. The first covering part 51, the second covering part 52, the third covering parts 53, the extending parts 54 are integrally formed of synthesized resin (plastic).

The inner pads 57 are soft members that are made of sponge, brought into elastically contact with the head, and attached to the inner face of the first covering part 51 and the second covering part 52. The cheek pads 58 are members brought into elastically contact with the skin near the zygomatic body and attached to at least the inner faces of the third covering parts 53. Specific examples of the materials of the inner pads 57 and the cheek pads 58 include polyurethane foam, melamine foam, polyester foam, fabric, nonwoven fabric, and raising material, sponge. The cheek pad 58 shown in FIG. 1 is formed by sewing a thick cloth (puff material) having a sponge embedded therein into a bag shape, and is attached so as to cover the peripheral surface of the third covering part 53.

The first covering part 51 is a portion that covers the frontal region and the left and right temporal portions of a head. The first covering part 51 is formed in a curved shape along a portion of the frontal bone and the temporal bones, and supports the frontal region and the left and right temporal regions via the inner pad 57. For example, as illustrated in FIG. 2A, the first covering part 51 is formed into a shape that covers the frontal region and the left and right temporal regions. For example, as illustrated in FIG. 2B, the first covering part 51 may be formed into a shape that wraps around the head from the left and right temporal portions to the rear of the auricle portions.

The first covering part 51 does not have to be shaped to cover the entire frontal region and the entire left and right temporal regions. For example, by forming an aperture on the first covering part 51, the weight may be reduced to such an extent that the frontal region and the left and right temporal regions can be stably supported. Alternatively, the entire shape may be simplified to such an extent that one point of the frontal region and two points of the left and right temporal portions are stably supported and the stiffness and the strength of the first covering part 51 are ensured.

The second covering part 52 is a region extending rearward from the first covering part 51 and covering the occipital portion of the head. The second covering part 52 is formed into curved shape along a part of the parietal bone and the occipital bone and supports the occipital region via the inner pad 57. The second covering part 52 illustrated in FIG. 2A is an example of a shape extending rearward from portions of the first covering part 51 which portions cover the left and right temporal regions, and the second covering part 52 illustrated in FIG. 2B is an example of shapes extending rearward from a portion of the first covering part 51 which portion covers the frontal region.

Like the first covering part 51, the second covering part 52 does not have to be shaped to cover the entire occipital region. For example, by forming an aperture on the second covering part 52, the weight may be reduced to such an extent that the occipital region can be stably supported. Alternatively, the entire shape may be simplified to such an extent that two points on the left and right of the occipital region are stably supported and the stiffness and the strength of the second covering part 52 are ensured.

The extending parts 54 is a pair of left and right portions extending downward from portions of the first covering part 51 which portions cover the left and right temporal portions. The extending parts 54 extend longitudinally so as to vertically pass the auricle regions and the front regions thereof in side view of the head, for example.

The third covering parts 53 are a pair of left and right portions extending forward from the respective extending parts 54 along the cheek bone and covering portions near the cheek bone (zygomatic bone). Third covering part 53 are formed in curved shapes along the cheek bone and supports the portions near the cheek bone via the cheek pads 58.

A cheek bone consists of the zygomatic arch and the zygomatic body. The zygomatic arches are portion extending in the anteroposterior direction, and have curved shapes protruding outward from the left and right sides like an arch. The rear sides of the zygomatic arches are engaged with the respective temporal bones. In addition, the zygomatic body is a part of the cheek bone located in front of the zygomatic arch, and forms a portion from the lower part of the orbit to the outer side on the left or right side. The forward portion of the zygomatic body is joined to the upper jaw bone. Third covering parts 53 of the present embodiment extend forward from the lower portions (near the lower end portions) of the respective extending parts 54 along the zygomatic arches and cover portions near the zygomatic bodies (zygomatic bodies or upper jaw bones).

The first fixing part 55 is a portion provided on the first covering part 51 and is portion where the tractor 20 is secured. The position of the first fixing part 55 is provided at least at one point on the first covering part 51. In view of the stability of the tractor 20, the first fixing parts 55 may be set at multiple points. In the present embodiment, the first fixing parts 55 are arranged in the vicinity of the left and right temples (the vicinity of the portion corresponding to the temples) on the first covering part 51. The first fixing parts 55 are formed in, for example, hollow cylindrical shapes into which end portions of front-rear extending parts 42 to be described later are inserted and fixed.

The second fixing part 56 is a hole-shaped portion provided on the first covering part 51 or the extending part 54. To the second fixing part 56, a third supporting part 47 of the tractor 20 to be described below is secured. The position of the second fixing part 56 is set in the vicinity of the auricle, for example. In the present embodiment, a pair of left and right second fixing parts 56 are provided in the vicinity of first fixing parts 55 and also in the vicinity of the borders between the first covering part 51 and the respective extending parts 54. The positions where the third supporting part 47 are arranged can be varied by providing multiple second fixing parts 56.

The second covering parts 52 shown in FIG. 2A are provided in pair on the left and right sides, and extend substantially horizontally and rearward from respective portions of the first covering part 51 which portions cover the left and right temporal regions through the upper portions of the auricle portions. Here, one of the pair of left and right second covering parts 52 on the left side is referred to as a left occipital covering part, and the other is referred to as a right occipital covering part. The left occipital covering part extends rearward from the left temporal region of the head, and the right occipital covering part extends rearward from the right temporal portion of the head.

Further, in rear view of the orthotic helmet 50, a space 61 is formed between the left occipital covering part and the right occipital covering part. This easily allows relative movement and elastic deformation between the left occipital covering part and the right occipital covering part, so that the orthotic helmet 50 is easily put on and off and wearing comfortability (fitting feeling, sense of stability) of the orthotic helmet 50 is enhanced.

Figure 8A:
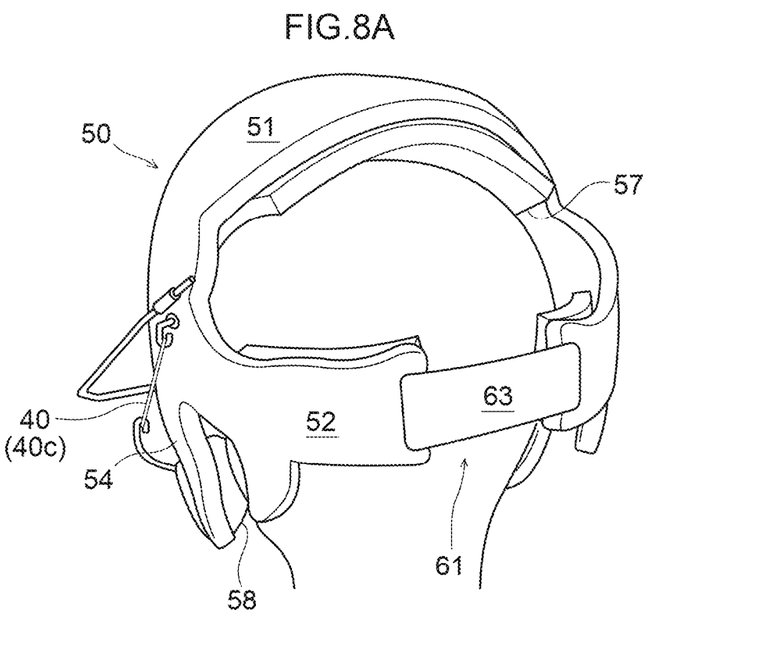
FIGS. 8A and 8B are perspective views showing an orthotic helmet according to a modification.

As shown in FIG. 8A, the left occipital covering part and the right occipital covering part may be coupled to each other with a band member 63 (e.g., a rubber band, a belt, a hook-and-loop fastener). For example, the left and right second covering parts 52 may be coupled by forming an aperture on each of the left and right second covering parts 52 and inserting a strap through the apertures. Alternatively, the hooked surfaces of the hook-and-loop fastener may be bonded to the left and right second covering parts 52 and are coupled by the looped surfaces of the hook-and-loop fasteners.

Figure 8B:
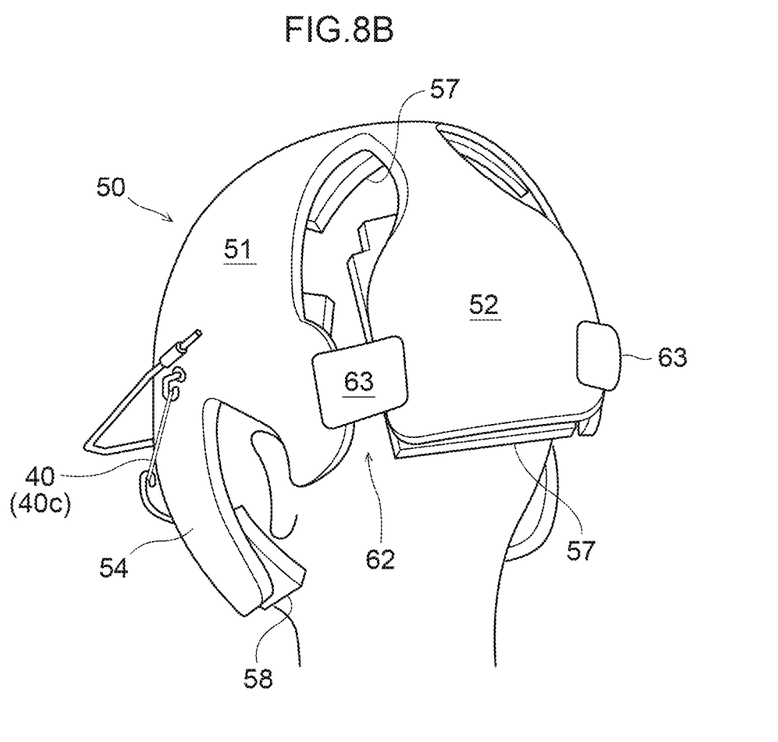

The entire shape of the second covering part 52 shown in FIG. 2B is a scoop shape which has a thin upper portion and has a width spread as approaching the lower portion. In addition, between the second covering parts 52 and portions of the first covering part 51 which portions cover the left and right temporal regions, slit parts 62 are provided which horizontally separate the second covering part 52 from the first covering part 51. The upper ends of the slit parts 62 reach closely to the parietal region. This easily allows relative movement and elastic deformation between the first covering part 51 and the second covering parts 52, so that the orthotic helmet 50 is easily put on and off and wearing comfortability (fitting feeling, sense of stability) of the orthotic helmet 50 is enhanced. As shown in FIG. 8B, the first covering part 51 and the second covering part 52 may be connected to each other by band members 63.

1-2. Orthotic Device

Figure 3:
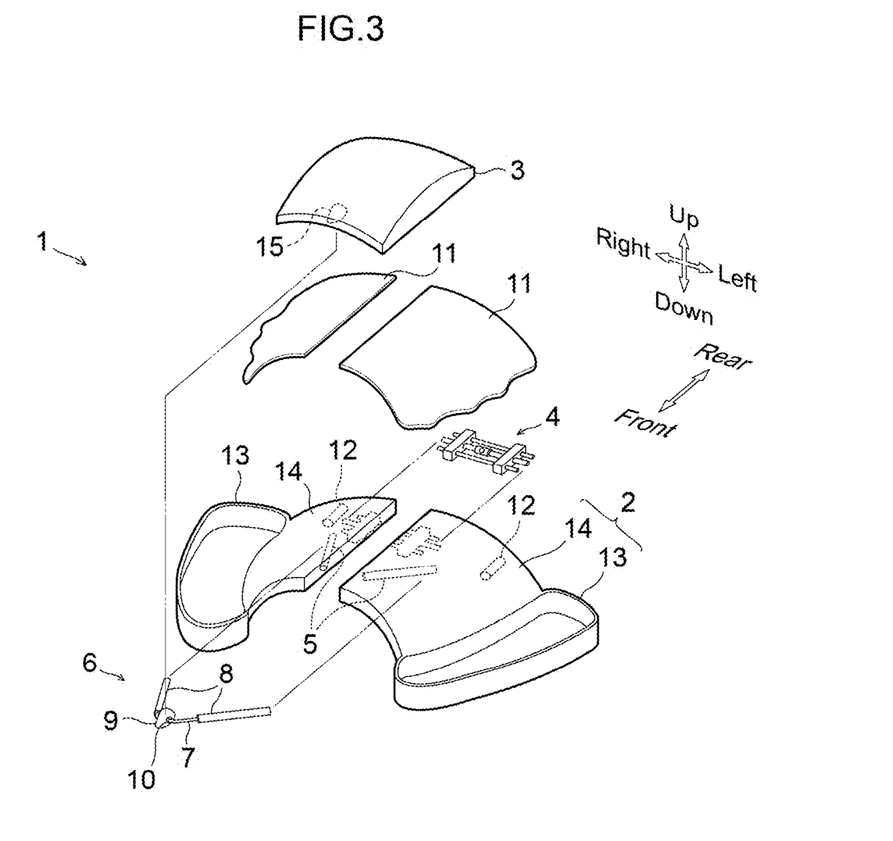
FIG. 3 is an exploded perspective view showing an orthotic device 1 attached to an upper jaw in a mouth.

FIG. 3 is an exploded perspective view showing the configuration of the orthotic device 1. The two-dot chain lines in FIG. 3 are imaginary lines for indicating the positions of the respective components prior to explosion. The orthotic device 1 is provided with a pair of left and right sliding members 2, a depressing plate 3, an adjuster mechanism 4, a pair of left and right guiding holes 5, and a guiding member 6.

The sliding members 2 is a pair of members attached one to each of the right side and the left side of the upper jaw dentition. Each sliding member 2 is provided with, for example, a locking part 13 which is a part to be locked to the crowns, and a curved face part 14 which is developed in a curved shape from the locking part 13 along the palate.

The locking parts 13 are, for example, formed in three-dimensional shapes (impressive shape of the dentition) that conform to the dentition shape of the wearer (user) of the orthotic device 1, and is attached so as to cover the crowns. Alternatively, the locking parts 13 may be formed into shape indirectly attached to the dentition via a fixing member such as an orthotic band (a metallic component formed in an annular shape surrounding outer circumferences of teeth) or a wire. In addition, the curved face part 14 is formed in a curved shape along palate, for example. A part of curved face part 14, which part touches the palate, is formed into a three-dimensional shape conforming to the palate. In the curved face part 14, an attaching metal fitting 12 in a hollow cylindrical shape for connecting the tractor 20 is embedded.

The depressing plate 3 is a member for depressing the palate forward and upward. The depressing plate 3 is a curved member arranged so as to straddle the left and right curved face parts 14 in top view, and is deployed along the median palate suture of the upper jaw bone. The upper surface side of the depressing plate 3 is brought into contact with the palate and is therefore formed into a three-dimensional shape conforming to the palate. Between the sliding members 2 and the depressing plate 3, sliding plates 11 are interposed so that the depressing plate 3 is slidable relative to the sliding members 2. The sliding plates 11 are members for allowing the depressing plate 3 to easily slide, and are formed into curved shapes of, for example, resin-sheets and films for protecting a mucosa.

The adjuster mechanism 4 is a component to adjust the distance between the two sliding members 2 and is arranged between the pair of sliding members 2. By rotating a nut member built into the adjuster mechanism 4, the sliding members 2 are moved in the approaching direction or the separating direction, so that the distance between the sliding members 2 can be adjusted.

The guiding hole 5 is a hole formed in each sliding member 2. Into the guiding hole 5, the end portion of the guiding member 6 is inserted and fixed. The apertures of the guiding holes 5 are set on opposing surfaces (or portions close to the opposing surfaces) facing each other of the two curved face parts 14 adjacent to each other in the left-right direction.

The guiding member 6 is a component that moves the depressing plate 3 forward and upward on the basis of the positions of the sliding members 2, and is provided between the respective sliding members 2 and the depressing plate 3. The guiding member 6 is provided with a guiding pin 7, pin tubes 8, a triangle part 9, and a bead part 10.

The guiding pin 7 is a member slidably inserted into the two guiding holes 5 formed in the respective sliding members 2. The entire shape of the guiding pin 7 is V-shaped. The pin tubes 8 are cylindrical members that are secured while being placed inside the guiding holes 5.

The triangle part 9 is a component to couple the guiding pin 7 to the depressing plate 3 and is secured to a fitting part 15 of the depressing plate 3. The triangle part 9 is formed into an isosceles triangular shape with the apex facing forward in top view. To the triangle part 9, a cylindrical bead part 10 is fixed. The guiding pin 7 is provided so as to be loosely inserted into the bead part 10 and thereby penetrate triangle part 9.

When the distance between the left and right sliding members 2 widens, the pin tubes 8 embedded in the respective sliding members 2 make translation movement to the left and right while keeping the angle defined by themselves. At this time, the reaction force that the guiding pin 7 placed inside the pin tubes 8 receives from the pin tubes 8 acts to move the guiding pin 7 forward along the extending directions of pin tubes 8. Accordingly, the guiding pin 7 moves forward. In this way, the guiding member 6 functions to move the depressing plate 3 forward and upward as the distance between the two sliding members 2 is increased.

1-3 Tractor

Figure 4:
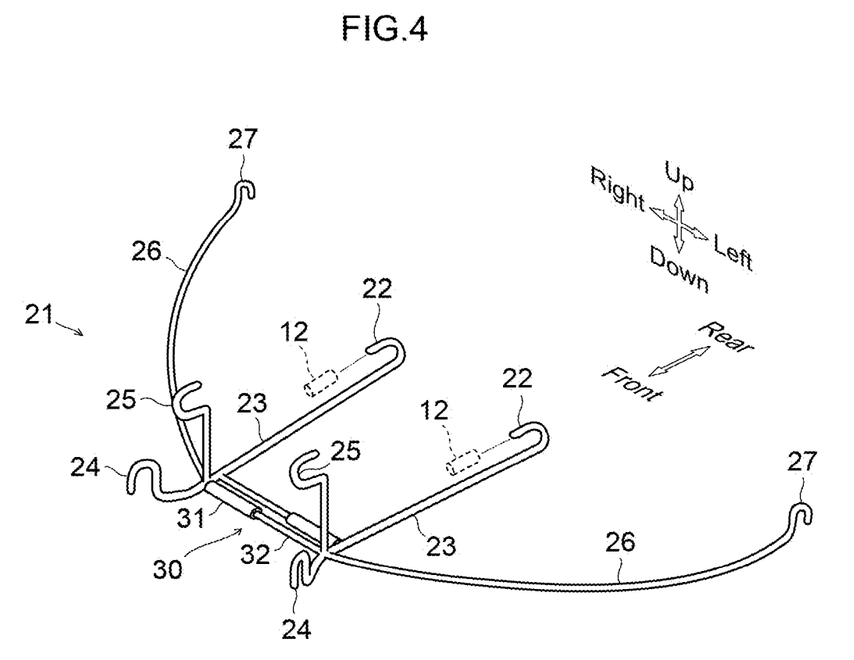
FIG. 4 is a perspective view showing a pulled part of a tractor.
Figure 5A:
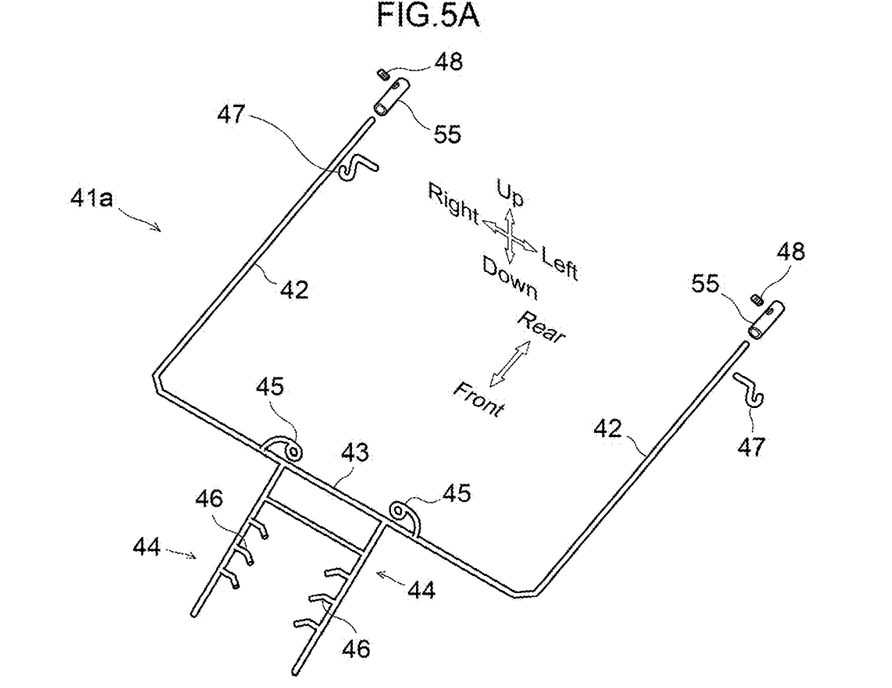
FIGS. 5A and 5B are perspective views showing the configuration of a helmet fixing part of the tractor.
Figure 5B:
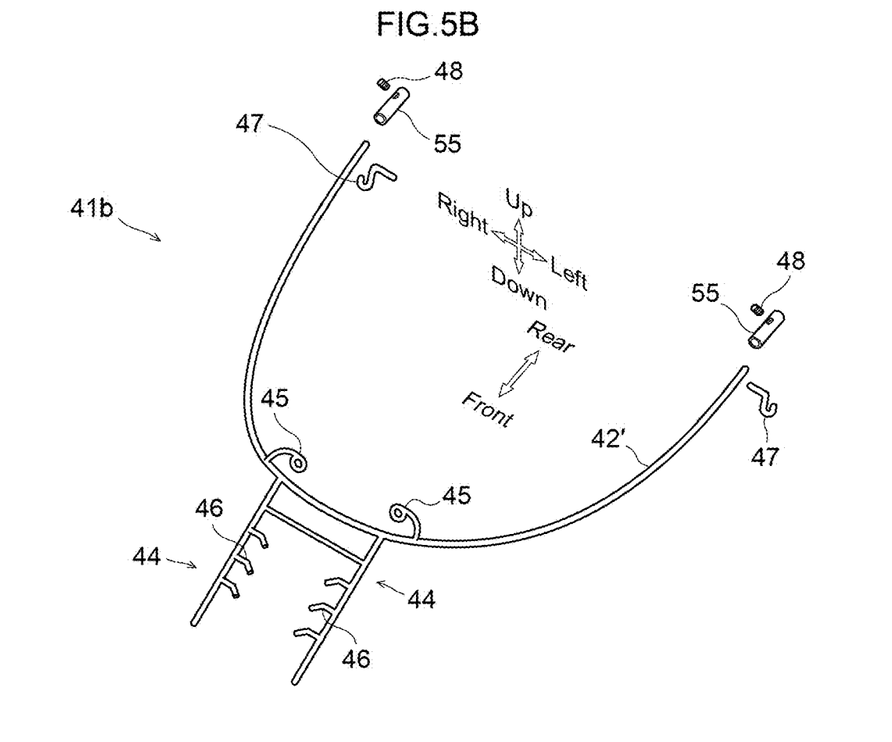
Figure 6:
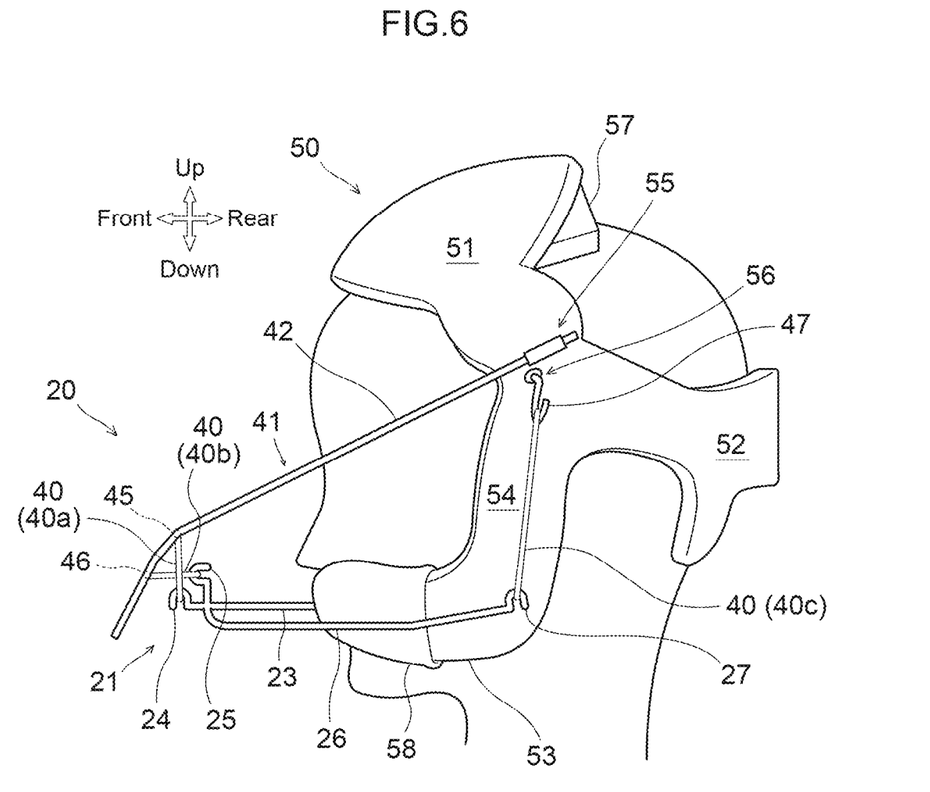
FIG. 6 is a side view showing a worn state of the orthotic helmet and the tractor.

FIG. 4 is a perspective view showing a configuration of the pulled part 21 coupled to the orthotic device 1 and included in the tractor 20. FIGS. 5A and 5B are perspective views showing configurations of the helmet fixing part 41 fixed to the orthotic helmet 50 and included in the tractor 20. FIG. 6 is a side view showing the worn state of the tractor 20 and the orthotic helmet 50. One end of each elastic member 40 is attached to the pulled part 21 and the other end is attached to the helmet fixing part 41. The helmet fixing part 41 supports elastic member 40 with respect to the orthotic helmet 50, and the pulled part 21 is pulled forward and upward by the elastic members 40 (first elastic members 40a, second elastic members 40b).

As shown in FIG. 4, the pulled part 21 includes attaching parts 22, forward extending parts 23, first locking parts 24, second locking parts 25, curved parts 26, third locking parts 27, and a movable mechanism 30. The elements constituting the pulled part 21 are provided in pairs on the left and right sides, and are formed so as to be substantially mirror symmetrically except for the movable mechanism 30. The attaching parts 22, the forward extending parts 23, the first locking parts 24, the second locking parts 25, the curved parts 26, the third locking parts 27 are integrally formed by bending and/or welding metallic wires.

The attaching parts 22 are portions that are inserted into and fixed to the attaching metal fittings 12 of the orthotic device 1 from the rear side, and are provided in a pair of left and right sides. Each attaching part 22 is provided so as to be removably inserted into the attaching metal fitting 12. Further, the forward extending parts 23 are portions extending forward from the respective attaching parts 22 to the outside of the mouth, and are formed in shapes extending straight. The attaching parts 22 of the present embodiment can be formed by bending the rear end of the respective forward extending parts 23 made of wires by 180 degrees.

The first locking parts 24 and the second locking parts 25 are portions welded and fixed to the front ends of the respective forward extending parts 23, and are each formed in a hook shape capable of locking the elastic member 40. The first locking parts 24 are provided so as to extend forward from the front end portions of the respective forward extending parts 23, and serve as portions to be urged (pulled, hauled) upward by the elastic members 40 (first elastic members 40a). In addition, the second locking parts 25 are provided so as to extend upward from the front end portions of the respective forward extending parts 23, and serve as portions to be urged forward by the elastic members 40 (second elastic members 40b).

The curved parts 26 are shaft-shaped portions that are welded and fixed to the front ends of the respective forward extending parts 23 and extend rearward of the head to portions near the auricles. The curved parts 26 are each formed in a curved shape protruding outward in top view. Further, the rear end of each curved part 26 is provided with a third locking part 27 formed in a hook shape. Each third locking part 27 serves as a portion urged upward by the elastic member 40 (third elastic member 40c). The position of the third locking part 27 is set behind the attaching parts 22 in side view.

The movable mechanism 30 is a mechanism that couples the left and right forward extending portions 23 to each other under a state where the width-direction distance between the forward extending portions 23 can be changed in response to the movement of the sliding members 2. The movable mechanism 30 is provided with at least one pair of a movable tube 31 fixed to one of the forward extending portions 23 and a shaft-shaped movable pin 32 fixed to the other forward extending part 23. The movable pin 32 is slidably inserted into the movable tube 31. The direction of the cylinder axis of the movable tube 31 matches the direction of the central axis of the movable pin 32, and the both are set in the left-right direction. The movable mechanism 30 shown in FIG. 4 has two pairs of the movable tube 31 and the movable pin 32.

As illustrated in FIG. 5A, the helmet fixing part 41 includes front-rear extending parts 42, a left-right extending part 43, outward extending parts 44, first supporting parts 45, second supporting parts 46, and third supporting parts 47. The elements constituting the helmet fixing part 41 are formed so as to be substantially mirror-symmetrical. The front-rear extending parts 42, the left-right extending part 43, the outward extending parts 44, the first supporting part 45, and the second supporting part 46 are integrally formed by welding metallic wires. The third supporting parts 47 are provided in separately forms from these components.

The front-rear extending parts 42 are a pair of left and right wire-shaped portions extending in the front-rear direction. The rear end portions of the front-rear extending parts 42 are inserted into first fixing parts 55 in hollow cylindrical shapes and fixed by fastening screws 48 in arbitrary inserted positions. If the fixing position does not need to be adjusted, the front-rear extending parts 42 may be secured to the first fixing parts 55 by welding or the rear end of the front-rear extending parts 42 may be directly adhered to the orthotic helmet 50, omitting the first fixing parts 55.

The left-right extending part 43 is a wire-shaped portion that couples the front end portions of the pair of left and right front-rear extending parts 42 to each other in the left-right direction. The position of left-right extending part 43 is set so as to be set slightly above the mouth when the wearer of the orthotic helmet 50 is viewed from the front, for example. The outward extending parts 44 are portions extending forward from the left-right extending part 43, and are provided in pair of the left and right portions. The outward extending parts 44 of the present embodiment are formed to extend forward and obliquely downward the from left-right extending part 43.

Note that the shapes of the front-rear extending parts 42 and the left-right extending part 43 are not limited to the shapes shown in FIG. 5A. Alternatively, as shown in FIG. 5B, a portion corresponding to the front-rear extending parts 42 and the left-right extending part 43 may be formed by a single bent member 42' curved in an arc shape. This makes it easy to change the width size of the bent member 42' (i.e., adjust to adapt the width of the head of the wearer), so that the versatility of the helmet fixing part 41 can be enhanced.

At positions on either left-right extending parts 43 or the outward extending parts 44, first supporting parts 45 and second supporting parts 46 all of which are formed into hook shapes able to lock the elastic members 40 are provided. The first supporting parts 45 are portions that are engaged with elastic members 40 (first elastic members 40a) locked to the first locking parts 24 and supports downward reaction force. In addition, the second supporting parts 46 are portions that are engaged with elastic members 40 (first elastic members 40b) locked to the second locking parts 25 and support rearward reaction force. The first supporting parts 45 of the present example are provided to the left-right extending part 43, and the second supporting parts 46 are provided to the outward extending parts 44.

The elastic members 40 (first elastic members 40a) connecting the first locking parts 24 to the first supporting parts 45 acts to pull the pulled part 21 upward with respect to the helmet fixing part 41, and therefore may be referred to as a vertical rubber (upward pulling rubber). Similarly, the elastic members 40 (first elastic members 40b) connect the second locking parts 25 to the second supporting parts 46 acts to pull the pulled part 21 forward with respect to the helmet fixing part 41, and therefore may be referred to as a horizontal rubber (forward pulling rubber).

As shown in FIG. 6, the first supporting parts 45 are arranged so as to be positioned at least above the first locking part 24 of the pulled part 21, and are preferably arranged so as to be positioned in the vicinity of the upright portions of the first locking parts 24. In addition, the second supporting parts 46 are arranged so as to be positioned at least forward second first locking part 25 of the pulled part 21, and are preferably arranged so as to be positioned in the vicinity of the portions right in front of the second locking parts 25. In the example illustrated in FIGS. 5A and 5B, the second supporting parts 46 are disposed at multiple positions, so that the traction direction of the second locking part 25 can be finely adjusted. Similarly, also the first supporting parts 45 may be disposed at multiple positions so that the traction direction of the first locking part 24 can be finely adjusted.

The third supporting parts 47 are portions that are engaged with the elastic members 40 (third elastic members 40c) locked to the third locking parts 27 of the pulled part 21 and support downward reaction force, and are provided in pair of the left and right portions. The third supporting parts 47 are formed into hook shapes capable of locking the elastic members 40 (third elastic members 40c) and are inserted into and fixed to the second fixing parts 56 of the orthotic helmet 50. By pulling the third locking parts 27 upward by the elastic members 40 (third elastic members 40c) locked with the third supporting parts 47, counterclockwise moment is generated on the attaching parts 22 and the attaching metal fittings 12 in side view shown in FIG. 6, and consequently the orthotic device 1 can apply the depressing force in the correct direction to the upper jaw.

2. Procedure of Manufacturing

Figure 7:
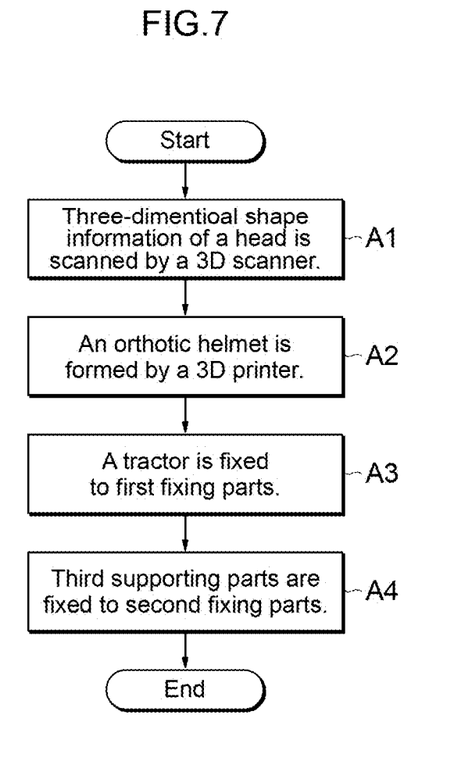
FIG. 7 is a flow diagram showing a procedure of manufacturing the orthotic helmet.

FIG. 7 is a flow chart illustrating a process of manufacturing the orthotic helmet 50. The orthotic helmet 50 is manufactured using, for example, a computer such as a workstation or a server with a three-dimensional (3D) CAD system and a 3D scanner device and a 3D printer connected to the computer. In Step A1, for the person who uses the orthotic device 1, the 3D shape information of the head is scanned (acquired) by the three-dimensional scanner. The scanned data is transmitted to a computer.

In the ensuing Step A2, data of the orthotic helmet 50 having an inner shape corresponding to the 3D shape is created on a 3D CAD system with reference to the 3D shape information obtained by the 3D scanner and the orthotic helmet 50 based on the created data is formed by the 3D printer. Specific examples of the synthetic resin serving as the material for orthotic helmet 50 include ABS, PLA, PET, TPU, polyamides (nylons), photocurable resins, PC (polycarbonates), and PP (polypropylenes).

For the orthotic helmet 50 formed here, at least the first covering part 51, the second covering part 52, the third covering parts 53, and the extending parts 54 are formed. The first fixing parts 55 and the second fixing parts 56 may be included in the manufacturing data of the orthotic helmet 50 in advance. Alternatively, after the orthotic helmet 50 not having the first fixing parts 55 and the second fixing parts 56 is formed, holes for attaching the first fixing parts 55 and holes serving as the second fixing parts 56 may be formed.

In Step A3, the first fixing part 55 in hollow cylindrical shapes are attached to the orthotic helmet 50 and the front-rear extending parts 42 of the helmet fixing part 41 are inserted into and fixed to the first fixing parts 55. In the ensuing Step A4, the third supporting parts 47 are inserted into and fixed to the hole-shaped second fixing parts 56. This completes the orthotic helmet 50 that is less likely to displace the traction direction of the orthotic device 1 by the tractor 20.

3. Effect (1) As shown in FIG. 1, the orthotic helmet 50 includes the first covering part 51, the second covering part 52, the pair of left and right third covering parts 53, the pair of left and right extending parts 54, and the first fixing parts 55. The first covering part 51 covers the frontal region and the left and right temporal portions of a head. The second covering parts 52 are formed by extending rearward from the first covering part 51 and cover the occipital portion of the head. The extending parts 54 extend downward from portions of the first covering part 51 which portions cover the left and right temporal portions. The third covering parts 53 extending forward from the extending parts 54 along the zygomatic arches and cover in the vicinity of the zygomatic bodies. The first fixing parts 55 are provided on the first covering part 51 and are secured with the tractor 20 is fixed.

With such a configuration, the stability of the worn state of the orthotic helmet 50 on the head can be enhanced. Further, providing the first fixing parts 55 to the orthotic helmet 50 make it possible to firmly fix the tractor 20 (helmet fixing parts 41) to the orthotic helmet 50. Accordingly, the displacement of the traction direction of the orthotic device 1 by the tractor 20 can suppressed, so that the orthodontic effects of the jawbone and dentition can be enhanced.

In addition, with regard to the displacement of the orthotic helmet 50 caused by an external force, the headgear of the related RAMPA® device as described in, for example, Japanese Patent No. 4058105 may significantly displace the position of the chin cap supporting the jaw when the RAMPA rotates in the pitch direction (counterclockwise direction in side view of FIG. 6) around the vicinity of the frontal region due to external force. This tends to easily distort the entire shape of the headgear and has a problem of difficulty in suppressing the displacement in the traction direction by the tractor 20.

As a solution to the above, since the rear ends of the helmet fixing part 41 are secured to the first covering parts 51 in the orthotic helmet 50 described above, the displacement of the tractor 20 can be relatively small even when the orthotic helmet 50 rotates in the pitch direction around a portion close to the frontal region. As a result, the orthotic helmet 50 can suppress the displacement of the traction direction of the orthotic device 1 by the tractor 20 as compared with existing headgear, so that that the orthodontic effects of the jawbone and dentition can be enhanced.

Further, since the above orthotic helmet 50 consists of the first covering part 51, the second covering parts 52, the pair of left and right third covering parts 53, the pair of left and right extending parts 54 integrally formed of synthetic resin, the entire shape of the orthotic helmet 50 is less likely to distort as compared with a headgear formed of a wire frame. Accordingly, the displacement of the traction direction of the orthotic device 1 by the tractor 20 can suppressed as compared with existing headgear, so that the orthodontic effects of the jawbone and dentition can be enhanced.

(2) As shown in FIG. 1, the first fixing parts 55 of the present embodiment are arranged in the vicinity of the left and right temples (the vicinity of the portion corresponding to the temples) on the first covering part 51. This structure makes it possible to firmly fix the tractor 20 to the orthotic helmet 50 without obstructing the visibility of the wearer of the orthotic helmet 50. Accordingly, the orthodontic effects of the jawbone and dentition can be enhanced.

(3) In the present embodiment, the inner pads 57 made of sponge and elastically brought into contact with the head are attached to the inner face of the first covering part 51 and the second covering part 52. This configuration makes it possible to enhance the fitting comfortability of the first covering part 51 and the second covering part 52 to the head, so that the stability of the worn state of the orthotic helmet 50 on the head can be enhanced.

(4) The third covering parts 53 of the present embodiment are provided with cheek pads 58 brought into elastic contact with skin near the zygomatic body. This configuration makes it possible to enhance the fitting comfortability of the third covering parts 53 to the skin near the zygomatic bodies, so that the stability of the worn state of the orthotic helmet 50 on the head can be enhanced. In addition, a structure that supports portions near the zygomatic bodies has an advantage that is less likely to disturb the movement of the jaw and the mouth than a structure that supports the lower jaw, and accordingly, as an advantage, the wearer is less annoyed during conversation and eating.

(5) As illustrated in FIG. 2A, the second covering parts 52 may extend rearward from portions of the first covering part 51 which portion cover the left and right temporal portions. In this case, providing the space 61 between the left occipital covering portion and the right occipital covering portion easily allows relative movement and elastic deformation between the left occipital covering part and the right occipital covering part. This can further enhance wearbility and detachability and wearing comfortabilty of the orthotic helmet 50.

As shown in FIG. 8A, the left occipital covering part and the right occipital covering part may be connected with the band member 63. In this case, the positional deviation of the orthotic helmet 50 with respect to the head can be effectively suppressed, and the stability of the orthotic helmet 50 in a worn state can be enhanced. For example, when the wearer lies down on a sofa or a bed while wearing the orthotic helmet 50, the position of the orthotic helmet 50 can be made less likely to be displaced with respect to the head.

(6) As shown in FIG. 2B, the second covering part 52 may extend rearward from portion of the first covering part 51 which portion cover the frontal region. In this instance, providing the slit parts 62 between the portions of the first covering part 51 which portions cover the left and right temporal regions and the second covering part 52 easily allows relative movement and elastic deformation between the first covering part 51 and the second covering part 52. This can further enhance wearbility and detachability and wearing comfortabilty of the orthotic helmet 50. As shown in FIG. 8B, the first covering part 51 and second covering part 52 may be connected to each other by band members 63. Thereby, the positional deviation of the orthotic helmet 50 with respect to the head can be effectively suppressed, and the stability of the orthotic helmet 50 in a worn state can be enhanced.

(7) In the present embodiment, the second fixing parts 56 that supports the pulled part 21 that is coupled to the orthotic device 1 and extending outside the mouth is provided to the first covering part 51 or the extending parts 54. The can generate counterclockwise moment on the attaching parts 22 and the attaching metal fittings 12 in side view shown in FIG. 6, and consequently the orthotic device 1 can apply the depressing force in the correct direction to the upper jaw. Accordingly, the orthodontic effects of the jawbone and dentition can be enhanced.

4. Miscellaneous

The above embodiment is merely illustrative, and is not intended to exclude the use of various modifications and techniques not explicitly described in the present embodiment. Each configuration of the present embodiment can be variously modified and implemented without departing from the scope thereof. In addition, the configurations of the present embodiment can be selected and omitted as needed, or can be combined appropriately.

Among the various components constituting the orthotic helmet 50 of the embodiment, elements such as the inner pads 57, the cheek pads 58, the space 61, and the slit parts 62 may be omitted. It is sufficient that the orthotic helmet 50 includes at least the first covering part 51, the second covering part(s) 52, the third covering parts 53, the extending parts 54, and the first fixing part(s) 55. This configuration can suppress the displacement of the traction direction of the orthotic device 1 by the tractor 20, and the same actions and effects as those of the above embodiment can be obtained. In addition, considering the stability and the fitting comfortability when the wearer wears the orthotic helmet 50, the inner pad 57 may be partly applied to only a portion of orthotic helmet 50, and the thicknesses and the shapes of the inner pads 57 and the cheek pads 58 may be appropriately adjusted.

Figure 9A:
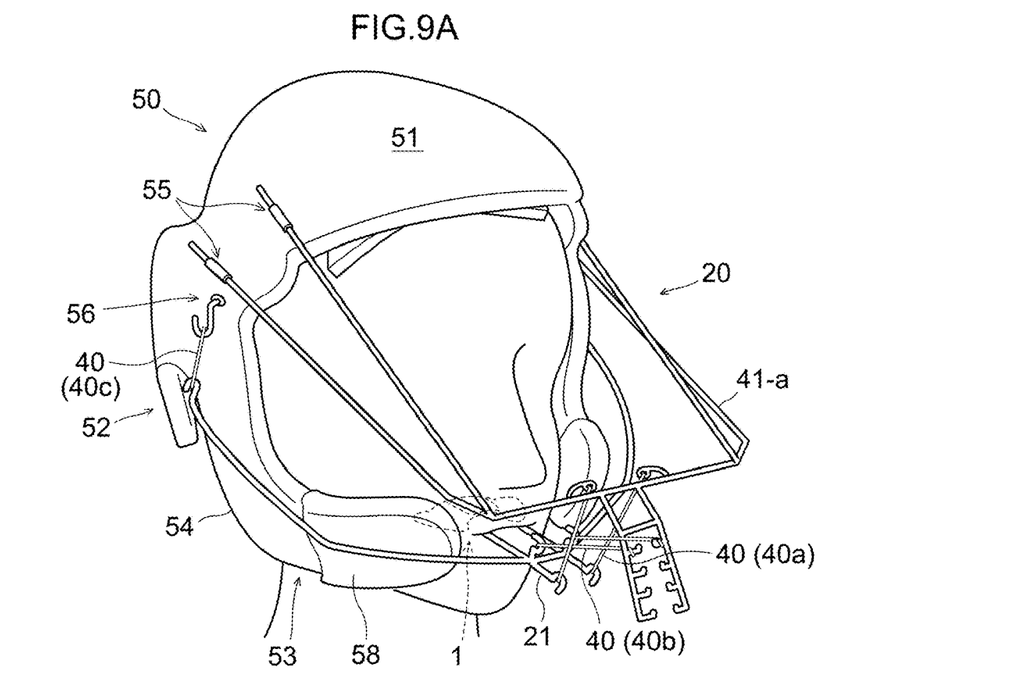
FIGS. 9A and 9B are perspective views showing an orthotic helmet according to another modification.

Further, the above embodiment exemplifies a structure in which the first fixing parts 55 are arranged in the vicinity of the right and left temples of first covering part 51, but the number of first fixing parts 55 can be modified. For example, as illustrated in FIG. 9A, the first fixing parts 55 may be provided at four positions on the first covering part 51. An increase in the number of fixation points of helmet fixing portion 41-*a* can enhance the shape-stability and stiffness of the tractor 20, and furthermore the orthodontic effect of the jaw position and dentition is enhanced.

Figure 9B:
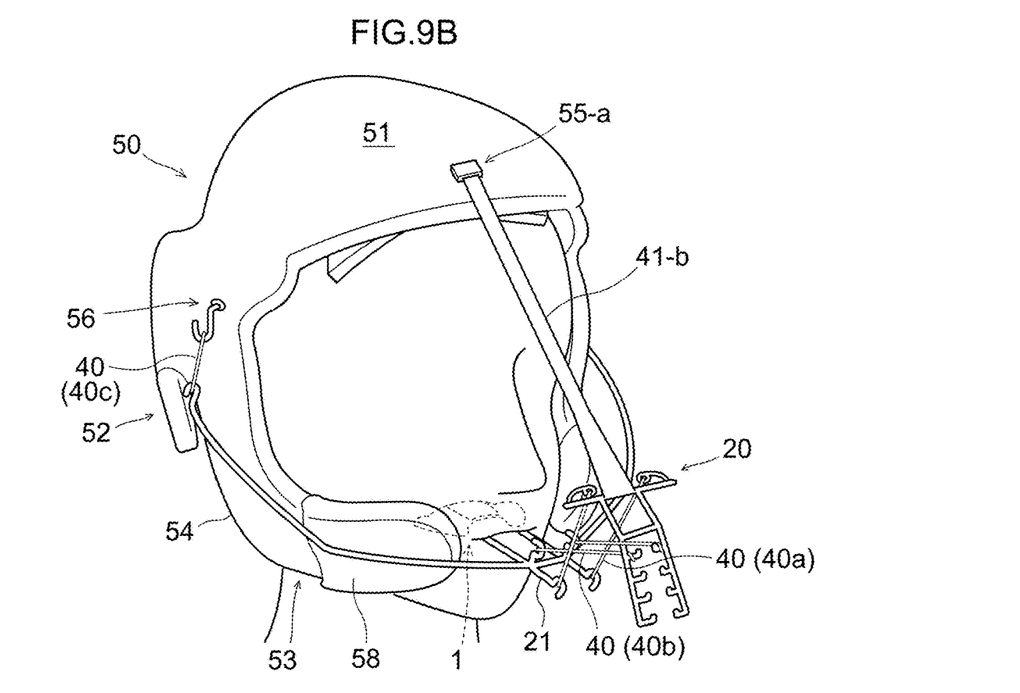

Alternatively, as illustrated in FIG. 9B, a single first fixing part 55*a* may be provided at one position of the first covering part 51. In this case, the first fixing part 55*a* may be disposed near the center of the forehead of the first covering part 51. Reducing the number of fixation points of the tractor 20 simplifies the configuration of the orthotic helmet 50, and thereby the manufacturing cost and time can be reduced. Further, setting the position of the first fixing part 55*a* near the center of the forehead makes it possible to ensure the field of view of the wearer of the orthotic helmet 50 to some extent. For the purpose of ensuring the field of view, the helmet fixing part 41-*b* may be partly formed of, for example, transparent resin material.

INDUSTRIAL APPLICABILITY

The present disclosure is applicable to the manufacturing industry of an orthotic helmet and a jaw position correcting apparatus used in the field of orthodontics and a maxillofacial oral growth treatment.

REFERENCE SIGNS LIST

1: orthotic device
2: sliding member
3: depressing plate
4: adjuster mechanism
5: guiding hole
6: guiding member
7: guiding pin
8: pin tube
9: triangle part
10: bead part
11: sliding plate
12: attaching metal fitting
13: locking part
14: curved face part
15: fitting part
20: tractor
21: pulled part
22: attaching part
23: forward extending part
24: first locking part
25: second locking part
26: curved part
27: third locking part
30: movable mechanism
31: movable tube
32: movable pin
40: elastic member
40*a*: first elastic member
40*b*: second elastic member
40*c*: third elastic member
41: helmet fixing part
42: front-rear extending part
43: left-right extending part
44: outward extending part
45: first supporting part
46: second supporting part
47: third supporting part
48: fastening screw
50: orthotic helmet
51: first covering part
52: second covering part
53: third covering part 54: extending part
55: first fixing part
56: second fixing part
57: inner pad
58: cheek pad
61: space
62: slit part

The invention claimed is:

1. A jaw position correcting apparatus comprising:
an orthotic device adapted to be attached to an upper jaw inside a mouth;
a tractor that pulls the orthotic device upward and forward; and
an orthotic helmet adapted to be worn by a head of a user of the orthotic device and fixing the tractor, wherein
the tractor comprises:
a pulled part coupled to the orthotic device and adapted for extending to an outside of the mouth, and
a helmet fixing part adjustably attached to the orthotic helmet,
the orthotic helmet comprises:
a first covering part that adapted to cover a frontal region and left and right temporal regions of the head,
a second covering part that extends rearward from the first covering part and adapted to cover an occipital region of the head,
a pair of extending parts that extend downward from portions of the first covering part, the portions being adapted for covering the left and right temporal regions,
a pair of third covering parts that extend forward from the extending parts so as to fit along zygomatic arches and so as to cover a portion near zygomatic body, and
a first fixing part provided on the first covering part and adjustably fixing the helmet fixing part,
the pulled part comprises:
a first locking part provided to a front end of a forward extending part adapted for extending from an inside of the mouth to an outside of the mouth and urged forward by a first elastic member, the first elastic member being interposed between the first locking part and the helmet fixing part,
a second locking part provided on the front end of the forward extending part and urged upward by a second elastic member, the second elastic member being interposed between the second locking part and the helmet fixing part, and
a third locking part provided on a rear end of a curved part extending from the front end of the forward extending part to a portion adapted to be near an auricle and urged upward by a third elastic member, the third elastic member being interposed between the third locking part and the orthotic helmet,
the helmet fixing part comprises:
a left-right extending part adapted to be located above the mouth when viewed from a front of the user of the orthotic helmet,
a front-rear extending part formed in a straight line extending from the left-right extending part to the first fixing part when viewed from a side of the user of the orthotic helmet, and
a supporting part provided separately from both the left-right extending part and front-rear extending part, and fixed to the orthotic helmet, and
the first fixing part is located above the supporting part.

2. The jaw position correcting apparatus according to claim 1, wherein
the first fixing part is adapted to be arranged on a portion near a center of a forehead or near a temple, the portion being included in the first covering part.

3. The jaw position correcting apparatus according to claim 1, further comprising inner pads made of sponge, provided inner face of the first covering part and the second covering part, and adapted to be brought into elastic contact with the head.

4. The jaw position correcting apparatus according to claim 1, further comprising a cheek pad provided to the third covering part and adapted to be brought into elastic contact with skin near the zygomatic body.

5. The jaw position correcting apparatus according to claim 1, wherein
the second covering part comprises a left occipital covering part that adapted to extend rearward from the left temporal region of the head and a right occipital covering part that adapted to extend rearward from the right temporal region of the head, and
a space is formed between the left occipital covering part and the right occipital covering part in rear view.

6. The jaw position correcting apparatus according to claim 5, further comprising a band member that connects the left occipital covering part and the right occipital covering part to each other.

7. The jaw position correcting apparatus according to claim 1, further comprising slit parts that horizontally separate portions of the first covering part from the second covering part, the portions adapted for covering the left and right temporal regions.

8. The jaw position correcting apparatus according to claim 7, further comprising band members that engage the second covering part with the portions covering the left and right temporal regions.

9. The jaw position correcting apparatus according to claim 1, wherein:
the orthotic device comprises:
a pair of sliding members each adapted to be worn on one of a left side and a right side of an upper dentition and each including a guiding hole formed thereon,
an adjuster mechanism provided between the pair of sliding members and adjusting a distance between the sliding members,
guiding pins slidably inserted into the guiding holes, and
a depressing plate engaged with the guiding pins and that moves forward and upward in proportional to an increase a distance between the pair of sliding members and depressing a palate in response to an increment in the distance between the sliding members adjusted by the adjuster mechanism.

10. The jaw position correcting apparatus according to claim 1, further comprising a second fixing part provided to the first covering part or the extending part and supporting the pulled part.

11. The jaw position correcting apparatus according to claim 1, wherein the third covering part is formed into a curved shape so as to fit along a cheek bone.

12. A method for manufacturing a jaw position correcting apparatus,
the jaw position correcting apparatus comprising:
an orthotic device adapted to be attached to an upper jaw inside a mouth;

a tractor that pulls the orthotic device upward and forward; and an orthotic helmet adapted to be worn by a head of a user of the orthotic device and fixing the tractor, wherein the tractor comprises:

a pulled part coupled to the orthotic device and adapted for extending to an outside of the mouth, and a helmet fixing part adjustably attached to the orthotic helmet, the orthotic helmet comprises:

a first covering part that adapted to cover a frontal region and left and right temporal regions of the head, a second covering part that extends rearward from the first covering part and adapted to cover an occipital region of the head, a pair of extending parts that extend downward from portions of the first covering part, the portions being adapted for covering the left and right temporal regions, a pair of third covering parts that adapted to extend forward from the extending parts so as to fit along zygomatic arches and so as to cover a portion near zygomatic body, and a first fixing part provided on the first covering part and adjustably fixing the helmet fixing part, and the pulled part comprises:

a first locking part provided to a front end of a forward extending part adapted for extending from an inside of the mouth to an outside of the mouth and urged forward by a first elastic member, the first elastic member being interposed between the first locking part and the helmet fixing part, a second locking part provided on the front end of the forward extending part and urged upward by a second elastic member, the second elastic member being interposed between the second locking part and the helmet fixing part, and a third locking part provided on a rear end of a curved part extending from the front end of the forward extending part to a portion adapted to be near an auricle and urged upward by a third elastic member, the third elastic member being interposed between the third locking part and the orthotic helmet, the helmet fixing part comprises:

a left-right extending part adapted to be located above the mouth when viewed from a front of the user of the orthotic helmet, a front-rear extending part formed in a straight line extending from the left-right extending part to the first fixing part when viewed from a side of the user of the orthotic helmet, and a supporting part provided separately from both the left-right extending part and front-rear extending part, and fixed to the orthotic helmet, and the first fixing part is located above the supporting part, the method comprising:

obtaining three-dimensional (3D) shape information of the head with a 3D scanner;

forming, based on the 3D shape information obtained by the 3D scanner, the orthotic helmet that comprises the first covering part, the second covering part, the pair of left and right third covering parts, the pair of left and right extending parts and that includes an internal shape corresponding to the 3D shape information with a 3D printer;

forming a tractor comprising a pulled part coupled to the orthotic device and the helmet fixing part fixed to the orthotic helmet;

fixing the helmet fixing part to the first covering part of the orthotic helmet;

interposing the first elastic member that urges forward the pulled part between the first locking part provided to the front end of the forward extending part of the pulled part and the helmet fixing part;

interposing the second elastic member that urges upward the pulled part between the second locking part provided to the front end of the forward extending part of the pulled part and the helmet fixing part; and interposing the third elastic member that urges upward the pulled part between the third locking part provided to the rear end of the curved part of the pulled part and the orthotic helmet.

* * * * *